(12) United States Patent
Imamura et al.

(10) Patent No.: US 6,758,521 B2
(45) Date of Patent: Jul. 6, 2004

(54) IN-VEHICLE MONITOR SUPPORT STRUCTURE

(75) Inventors: Masahiro Imamura, Wako (JP); Takeo Mizukoshi, Wako (JP); Satoru Minowa, Wako (JP); Toshiyuki Yasuhara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/225,674

(22) Filed: Aug. 21, 2002

(65) Prior Publication Data
US 2003/0042378 A1 Mar. 6, 2003

(30) Foreign Application Priority Data

Sep. 5, 2001 (JP) ...................................... P2001-269007
Sep. 5, 2001 (JP) ...................................... P2001-269008

(51) Int. Cl.[7] .............................................. A47C 7/72
(52) U.S. Cl. ..................................... 297/217.3; 248/919
(58) Field of Search ....................... 297/217.3; 248/917, 248/919

(56) References Cited

U.S. PATENT DOCUMENTS

| 5,177,616 | A | * | 1/1993 | Riday ................... 297/217.3 X |
| 5,179,447 | A | * | 1/1993 | Lain ......................... 297/217.3 |
| 5,195,709 | A | * | 3/1993 | Yasushi .................... 297/217.3 |
| 5,667,179 | A | * | 9/1997 | Rosen ......................... 248/917 |
| 6,007,036 | A | * | 12/1999 | Rosen ...................... 297/217.3 |

FOREIGN PATENT DOCUMENTS

JP          5-58502          8/1993

* cited by examiner

Primary Examiner—Anthony D. Barfield
(74) Attorney, Agent, or Firm—Merchant & Gould P.C.

(57) ABSTRACT

In an in-vehicle monitor support structure of the present invention, a rotation support section 16 which rotates about a vertical axis is provided on one of seats 11 and 12 positioned on the left and right of a vehicle with space provided therebetween, and a monitor 60 is supported by the rotation support section 16 in a state in which one side of the monitor is adjacent to the aforementioned axis and the other side is positioned laterally from the axis. Consequently, movement between the front and rear seats is easily achieved.

10 Claims, 14 Drawing Sheets

IN-VEHICLE MONITOR SUPPORT STRUCTURE

BACKGROUND OF THE INVENTION

1. Field of the Invention

The present invention relates to an in-vehicle monitor support structure which supports an in-vehicle monitor which is mainly viewed by a viewer seated in a rear seat.

2. Background Art

Conventional technology relating to an in-vehicle monitor support structure which supports an in-vehicle monitor which is mainly viewed by a viewer seated in the rear seats includes, for example, the structure disclosed in Japanese Utility Model Publication No. 5-58502. The in-vehicle monitor support structure disclosed in this publication supports a vehicle monitor on the rear of a console box arranged between the seats positioned on the left and right of the vehicle with space provided therebetween.

Recently, family passenger vehicles are used not only as a means of transport and conveyance, but are also used as, for example, a space for having meals and resting, and are often used as a base for leisure activities, and consequently, usability as a living space is a sought after feature in such vehicles.

One example which realizes this ease of use as a living space is an example in which the front seats are positioned on the left and right of the vehicle with space provided therebetween, and a console box is not positioned between these front seats, and by using this space between the front seats as a passage through which people can move from the rear seats to the front seats, so called walk-through access becomes possible.

However, when an in-vehicle monitor which is viewed mainly from the rear seats is installed in order to further improve the comfort level inside the vehicle, if as in the aforementioned publication, a construction is used in which the in-vehicle monitor is supported on the rear of the console box between the front seats, then of course the problem arises that the console box and the in-vehicle monitor are an obstacle to movement, and the type of walk through access described above becomes difficult.

In addition, sometimes the monitor is mounted on the headrest of the front seat, and although in this case walk through access is possible, in order for a plurality of people in the back seat to be able to view a monitor, a monitor must be provided in both the left and right headrests, which increases the cost.

A first object of the present invention is to provide an in-vehicle monitor support structure which enables increases in cost to be minimized, allows ready movement between the front and rear seats, that is, so called walk through access, and enables the monitor to be viewed comfortably even when the monitor is installed so as to be viewed mainly by viewers seated in the back seat.

Furthermore, as described above, when an in-vehicle monitor is positioned between the seats positioned on the left and right of the vehicle, with space provided therebetween, then if the vehicle is involved in a collision while moving, and the passenger in the center of the rear seat is not wearing a seatbelt, it is possible that this passenger may move forward on impact, and collide with the monitor or the support structure provided between the seats.

There are also roof mounted monitors in which the monitor is suspended from the interior roof of the vehicle, but while there is no chance of colliding with the monitor or the support section, a different problem arises in that because the monitor is mounted in a high position, the viewer must look diagonally upwards to view the monitor, which tires the viewer. In addition, ensuring that the support is sufficiently strong results in an increase in cost.

In addition, sometimes a monitor is embedded in the headrest of the front seat, but in this case also, although the passenger in the center of the back seat will not collide with the monitor or its support, for a plurality of people in the back seat to be able to view a monitor, monitors must be embedded in both the left and right headrests, which increases the cost.

A second object of the present invention is to provide an in-vehicle monitor support structure which allows comfortable viewing and enables increases in cost to be minimized, and can also absorb the energy of an impact should a passenger collide with the monitor or the support section.

BRIEF SUMMARY OF THE INVENTION

In an in-vehicle monitor support structure according to a first aspect of the present invention, a rotation section which rotates about a vertical axis is provided on one of the seats positioned on the left and right of the vehicle with space provided therebetween, on the side of the seat which faces the other seat, and the monitor is supported on the rotation section so that one side of the monitor is adjacent to the axis, and the other side of the monitor is positioned laterally from the axis.

Consequently, by rotating the rotation section, which is provided on one of the seats, on the side which faces the other seat, so as to rotate about a vertical axis, and positioning the monitor, which is supported on the rotation section so that one side of the monitor is adjacent to the axis and the other side of the monitor is positioned laterally from the axis, in an orientation where the side which is positioned from the axis is situated near the other seat, the monitor can be positioned so as to extend across the space between the seats, in a state which allows comfortable viewing from the rear seat. Consequently, because the monitor is positioned between the seats, a viewer does not need to look diagonally upward to view the monitor, and can view the monitor by looking substantially straight ahead. Furthermore, because the monitor is positioned between the seats, a plurality of people in the back seat can comfortably view a single monitor. On the other hand, by rotating the rotation section in the other direction, and positioning the monitor in an orientation where the side which is positioned laterally from the axis is positioned toward the rear seat, for example, the monitor can be moved away from the one seat and stowed against the other seat, and a passage through which people can pass is formed between the seats.

In the aforementioned construction, a terminal section which includes an external output terminal for outputting the audio of the monitor may be provided on a cover of the support section which supports the rotation section.

In this manner, because a terminal section which includes an external output terminal for outputting the sound of the monitor is provided on the cover of the support section which supports the rotation section, headphones can be connected easily from the rear seat.

On the other hand, an in-vehicle monitor support structure according to a second aspect of the present invention comprises a base section which is mounted on the vehicle, and a support section which is connected to the base section via a support shaft in a manner which enables rotation, and which supports the monitor. A guide groove is formed in one of either the base section or the support section, and in the other is provided a guide section which moves inside the guide groove when the support section rotates relative to the base section. In addition, a control plate which covers the guide groove is provided on the guide groove, and the movement of the guide section within the guide groove is controlled by the control plate. Consequently, the rotation of the support section relative to the base section is controlled, but if a load greater than a predetermined value is applied to the base section and the support section, the control plate is either deformed or broken by the guide section, allowing the support section to rotate relative to the base section.

In the aforementioned construction, normally, the rotation of the support section relative to the base section is controlled by controlling the movement of the guide section in the guide groove by means of the control plate. On the other hand, if a passenger should collide with the monitor or the support section, then because a load greater than a predetermined value is applied to the base section and the support section, the control plate is deformed or broken by the guide section, allowing the support section to rotate relative to the base section, and thereby absorbing the collision energy. Consequently, by providing the monitor between the seats, for example, the monitor can be viewed from the rear seat comfortably and increases in cost can be minimized, and furthermore the collision energy of any collision with the monitor or the support can be absorbed.

The base section may be provided on one of the seats positioned on the left and right of the vehicle with space provided therebetween, on the side of the seat which faces the other seat, and the axis of the support shaft may be directed from the seat on which the base section is provided in the direction of the other seat.

In such a case, the support shaft is provided on the base section, which is mounted on one of the seats positioned on the left and right of the vehicle with space provided therebetween, on the side of the seat which faces the other seat, and the support shaft is positioned with the axis directed from the seat on which the base section is provided, in the direction of the other seat, and because the monitor is supported on this support shaft via the support section, the monitor can be provided between the seats.

Furthermore, even if a passenger collides with the monitor or the support section, because a load greater than a predetermined value is applied to the base section and the support section, the control plate is deformed or broken by the guide section, allowing the support section to rotate around the support shaft relative to the base section, and absorb the collision energy. Consequently, a monitor can be provided between the seats, the monitor can be viewed from the rear seat comfortably and increases in cost can be minimized, and furthermore the collision energy of any collision with the monitor or the support can be absorbed.

A construction in which the monitor is supported by a monitor mounting section on a plate shaped mounting section in the support section, with notches formed in the sides of the monitor mounting section of the mounting base is also possible.

In such a case, because notches are formed in the sides of the monitor mounting section of the mounting base, in the case of a collision with the monitor or the support section, the monitor mounting section deforms easily relative to the mounting base, and as a result, collision energy can be further absorbed.

DETAILED DESCRIPTION OF THE INVENTION

Figure 1:
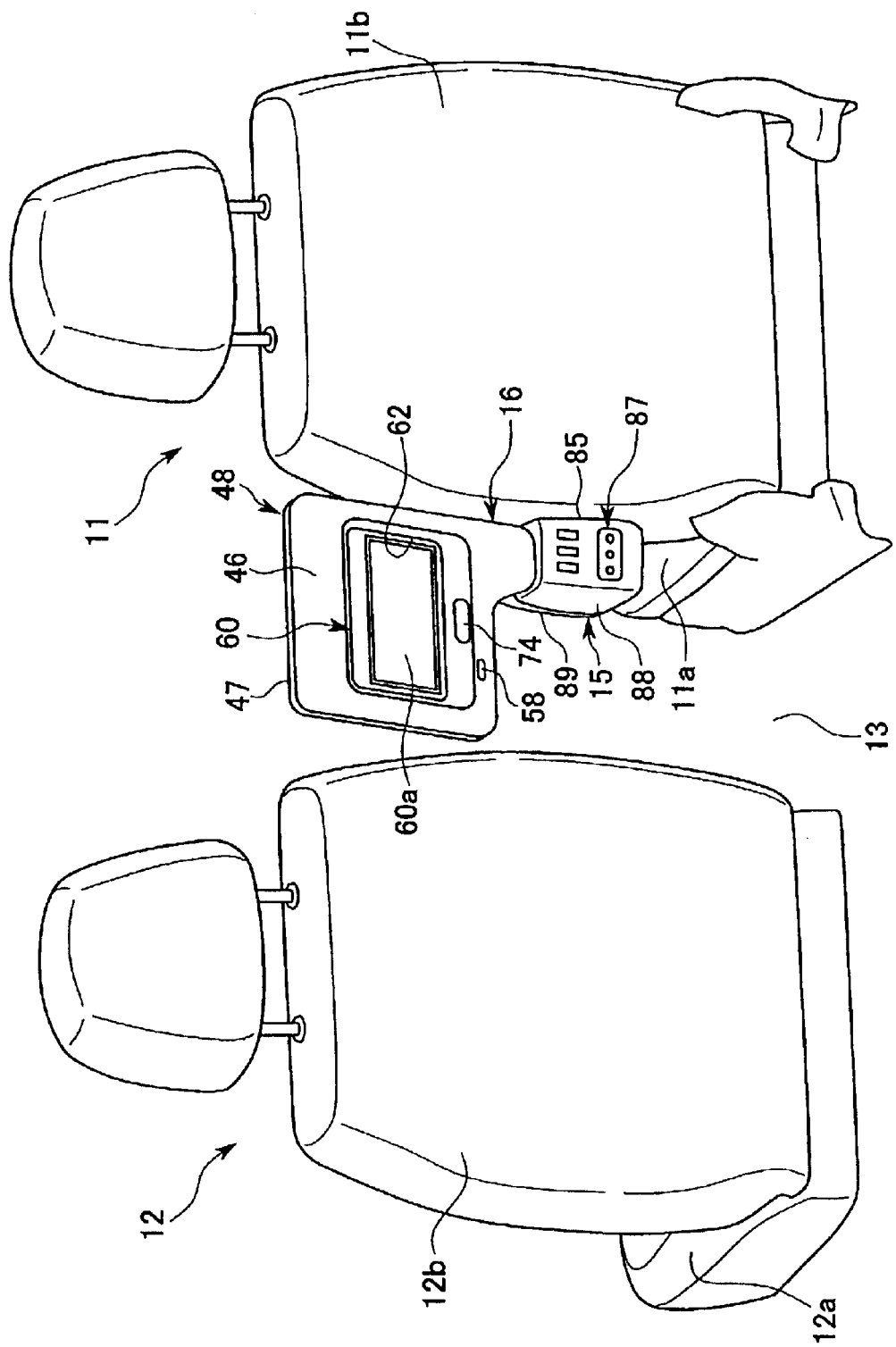
FIG. 1 is a perspective view showing an in-vehicle monitor support structure of the present invention, showing a state in which the monitor is extended laterally.

The in-vehicle monitor support structure according to an embodiment of the present invention is described below with reference to FIG. 1 through FIG. 14.

The in-vehicle monitor support structure according to the present embodiment is provided on one of the seats positioned on the left and right of the vehicle with space provided therebetween, on the side of the seat which faces the other seat. Specifically, in the case shown in FIG. 1, a driver seat (one of the seats) 11 and a passenger seat (the other seat) 12 are positioned on the right and the left of the vehicle with space provided therebetween, and the in-vehicle monitor support structure is mounted on the driver seat 11, on the side of the seat which faces the passenger seat 12. A console box or the like is not provided between the driver seat 11 and the passenger seat 12, and a flat passage surface 13 is formed between the seats.

The in-vehicle monitor support structure according to the present embodiment comprises a pivoting support section (support section) 15 which is provided on the side of the driver seat 11 which faces the passenger seat 12 and is able to be rotated about a horizontal axis, and a rotation support section (support section) 16 which is provided on this pivoting support section 15, and is able to be rotated about a vertical axis when positioned in a vertical state by the pivoting support section 15.

The driver seat 11 comprises a seat cushion 11a which mainly supports the posterior of the person sitting there, and a seat back 11b which mainly supports the back of the person, and in the same manner, the passenger seat comprises a seat cushion 12a and a seat back 12b.

Figure 2:
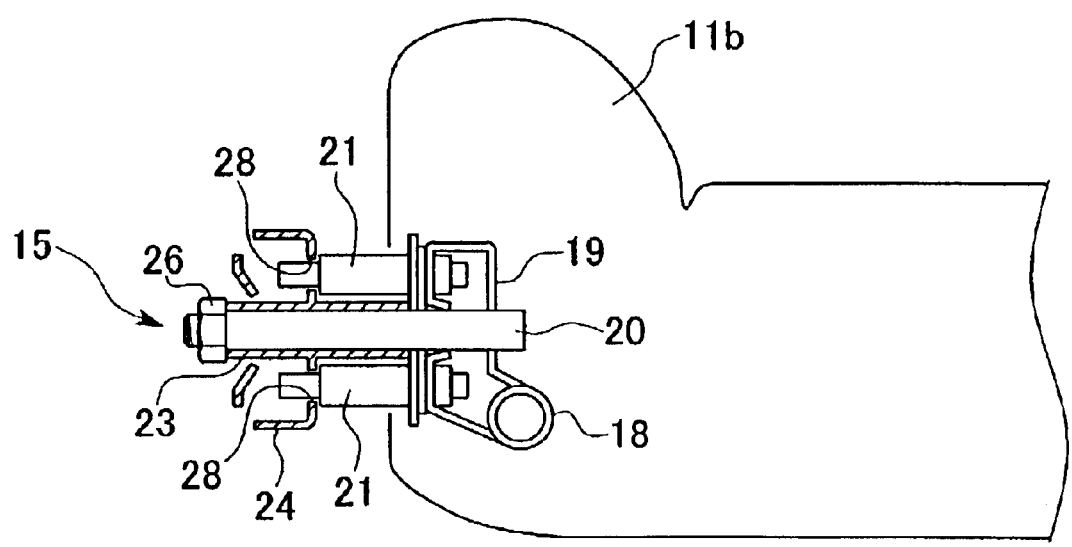
FIG. 2 is a cross-sectional view along the line X-X in FIG. 3 which shows a pivoting support section of the in-vehicle monitor support structure according to an embodiment of the present invention.

As shown in FIG. 2, a seat side mounting base section (base section) 19 is mounted on the vehicle. More specifically, the seat side mounting base section 19 is fixed to a seat frame 18 comprising a round pipe which is embedded in the seat back 11b of the driver seat 11. The aforementioned pivoting support section 15 is mounted on this seat side mounting base section 19, and comprises a pivoting support shaft (support shaft) 20 which is mounted on this seat side mounting base 19 so as to always follow a horizontal axis, in other words, in a state in which the pivoting support section 15 is always pointed in a direction from the driver seat 11 towards the passenger seat 12. A pair of metal guide pins (the guide section) 21 are mounted on the seat side mounting base section 19 in parallel with the pivoting support shaft 20, and positioned symmetrically on either side of the pivoting support shaft 20.

Figure 3:
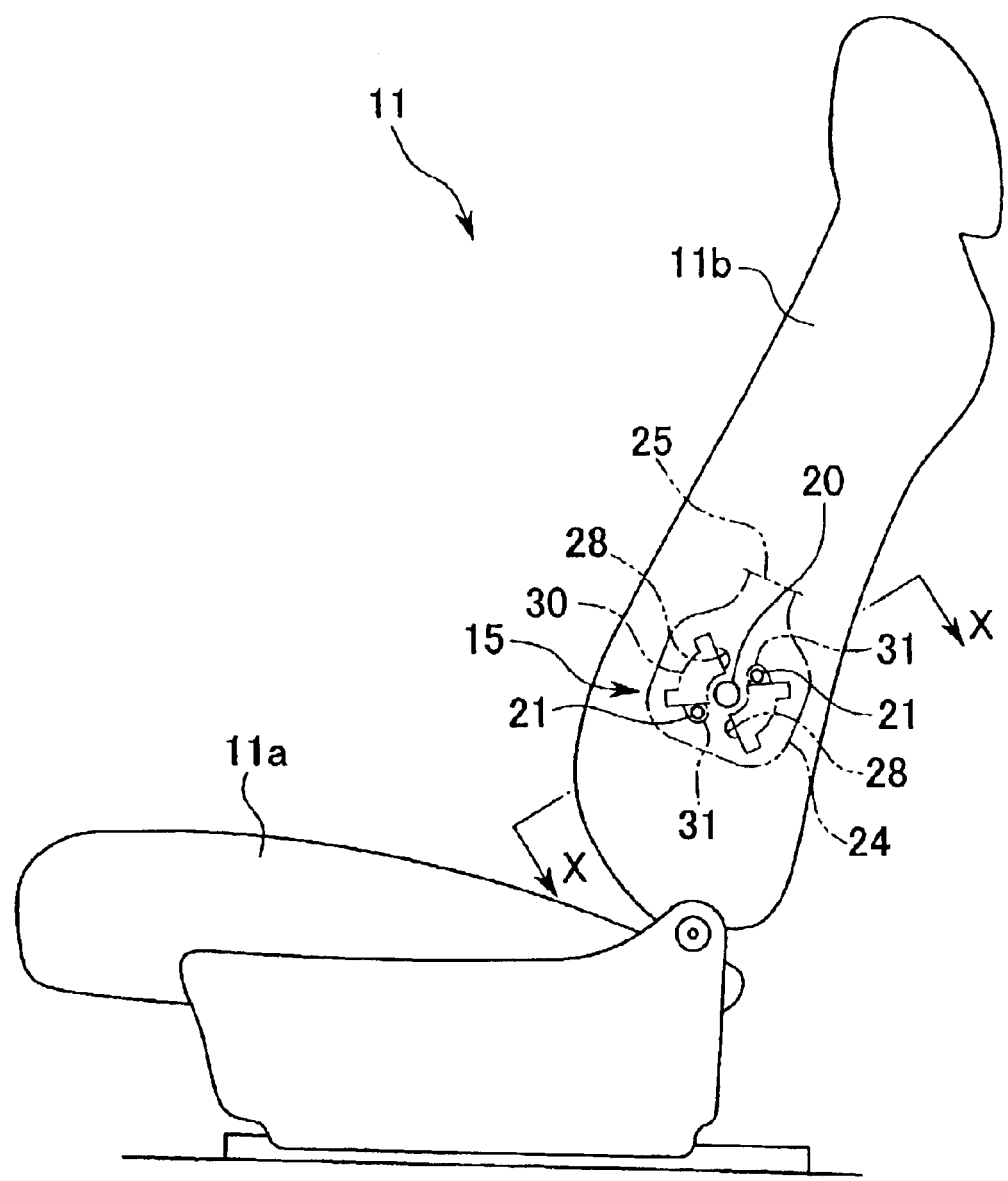
FIG. 3 is a side view showing a portion of the pivoting support section of the in-vehicle monitor support structure according to an embodiment of the present invention.
Figure 4:
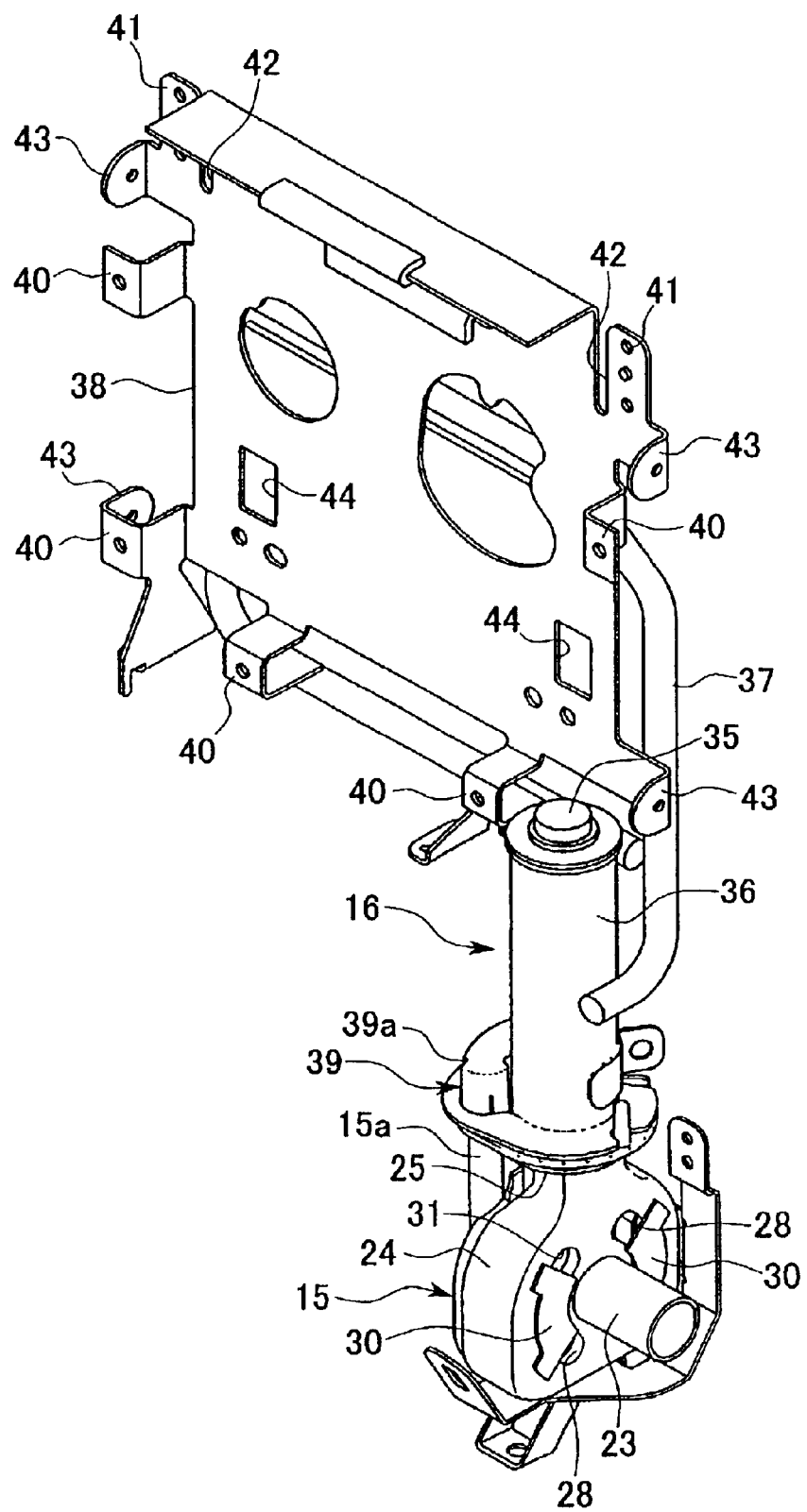
FIG. 4 is a perspective view showing the essential sections of the in-vehicle monitor support structure according to an embodiment of the present invention.

As shown in FIG. 2 through FIG. 4, the pivoting support section 15 comprises a support section outer casing 23 which by engaging with the pivoting support shaft 20 is able to be rotated about a left to right aligned center axis of this horizontal pivoting support shaft 20, a pivoting member 24 which is integrally mounted on this support section outer casing 23, and which comprises a mounting section 25 at the edge thereof in a direction orthogonal to the support section outer casing 23, and a nut member 26 which is screwed to the pivoting support shaft 20 for preventing the support section outer casing 23 from sliding off the pivoting support shaft 20.

A pair of circular arc guide grooves 28 centered about the pivoting support shaft 20 are formed in the pivoting member 24, in a symmetrical arrangement on both sides of the support section outer casing 23, and control plates 30 which partially cover each guide groove 28 are fixed to these guide grooves 28 by engagement with and welding to engagement sections (not shown in the diagram).

In a state in which the pivoting support shaft 20 is inserted into the support section outer casing 23, the guide pins 21 of the seat side mounting base section 19 are inserted with one to one correspondence into each of the openings 31 in the guide grooves 28 which are not covered by the control plates 30.

In a state in which the guide grooves 28 are not covered by the control plates 30, the guide pins 21 can move only within the corresponding guide groove 28, and consequently, the range of movement of the guide pin 21 which is determined by the guide groove 28 is limited to the range of rotation of the pivoting member 24 about the pivoting support shaft 20. Specifically, in a state in which the guide grooves 28 are not covered by the control plates 30, the pivoting member 24 can rotate between a state in which the mounting section 25 is positioned at the top through to a state in which the mounting section 25 is tilted forward so that it faces the front.

On the other hand, in a state in which the guide grooves 28 are covered by the control plates 30, the guide pins 21 are respectively inserted into the corresponding openings 31 of the guide grooves 28, and movement within the guide grooves 28 is thus controlled. In a state in which the guide pins 21 are inserted into the openings 31, the pivoting member 24 is in a state in which the mounting section 25 is positioned at the top, and any pivoting from this state is rendered impossible by the control plates 30. In other words, the rotation of the pivoting support section 15 relative to the seat side mounting base 19 is controlled by controlling the movement of the guide pins 21 within the guide grooves 28 by means of the control plates 30.

The control plates 30 are such that at least one of either the thickness or the materials used in the construction allows the control plates 30 to deform easily without also causing the guide pins 21 and the pivoting member 24 to deform, and as a result, if a load greater than a predetermined value is applied between the seat side mounting base section 19 and the pivoting member 24 of the pivoting support section 15, the control plates 30 are pushed against by the guide pins 21 and deform or break. As a result, the control plates 30 deform or break, thus broadening the openings 31 of the guide grooves 28, and the control plates 30 fall away from the guide grooves 28 upon breaking or deforming, and the pivoting member 24 of the support section 15 can then rotate relative to the seat side mounting base section 19, centered about the pivoting support shaft 20, through the action of the guide pins 21 moving along the broadened guide grooves 28.

The aforementioned rotation support section 16 is mounted on the mounting section 25 of the pivoting member 24. In other words, as shown in FIG. 4, the rotation support section 16 comprises a rotation support shaft 35, which is mounted on the mounting section 25 of the pivoting support section 15 so as to extend in a direction through this mounting section 25 and the center of the pivoting support shaft 20, a substantially cylindrical support section 36 into which the rotation support shaft 35 is inserted, and which can rotate about the rotation support shaft 35, a metal support frame 37 which is fixed to the support section 36, and a mounting base 38 made of sheet metal which is fixed to this support frame 37. The support frame 37 and the mounting base 38 are shaped so as to extend orthogonally outward from one side of the rotation axis of the rotation support shaft 35. In other words, one side of the support frame 37 and the mounting base 38 is adjacent to the rotation axis of the rotation support section 16 and the other side is positioned laterally from this rotation axis.

A rotation positioning member 15a is provided on the pivoting support section 15 on the side of the mounting section 25, and this rotation positioning member 15a moves within an annular guide depression 39 formed in the support section 36, and is positioned at either an in-use position or a storage position provided at either end of the annular guide depression 39. At both ends of the annular guide depression 39 are formed narrowed sections 39a (only one is shown in the figure) for positioning the rotation positioning member 15a into either the in-use position or the storage position. In other words, if the rotation positioning member 15a moves within the annular guide depression 39 and clears one of the narrowed sections 39a, the rotation positioning member 15a becomes positioned at a predetermined angle (the in-use position), and if the rotation positioning member 15a moves within the annular guide depression 39 and clears the other narrowed section 39a (not shown), the rotation positioning member 15a becomes positioned at a different predetermined angle (the storage position).

As described above, a state in which the guide grooves 28 of the pivoting member 24 of the pivoting support section 15 are covered by the control plates 30, and the guide pins 21 of the seat side mounting base section 19 are inserted into the remaining openings 31, in other words a state in which the rotation support shaft 35 extends upward due to the mounting section 25 being positioned at the top, is the basic upright orientation of the pivoting support section 15 and the rotation support section 16. In this upright orientation, the support section 36 of the rotation support section 16, the support frame 37 and the mounting base 38 rotate about the vertical rotation support shaft 35. To describe this upright orientation in detail, the rotation support shaft 35 substantially follows the orientation of the seat back 11b of the driver seat 11, and when the seat back 11b is in a driving position, the orientation of the rotation support shaft 35 is such that the top of the rotation support shaft 35 tilts slightly backward by a predetermined amount relative to the vertical. The rotation support section 16 is further described below, assuming the upright orientation when the seat back 11b is in the driving position.

A plurality of front cover mounting sections 40 are formed on the bottom and on both sides of the flat mounting base 38. A pair of monitor mounting sections 41 are formed on both sides of the top of the mounting base 38, in other words on both sides of the mounting base 38 at the opposite edge to the pivoting support section 15. Notches 42 are formed in the side of the monitor mounting sections 41 formed on the mounting base 38, specifically in positions inside the monitor mounting sections 41, and these notches 42 are formed with an opening on the opposite edge to the pivoting support section 15. In addition, a plurality of rear cover mounting sections 43 are formed on the top and bottom of both sides of the mounting base 38, and a pair of front cover engagement holes 44 are formed in the central part of the mounting base 38. A plastic front cover 46 is mounted on this mounting base 38 via the front cover mounting sections 40, and a synthetic resin rear cover 47 is mounted on the mounting base 38 via the rear cover mounting sections 43. The front cover 46 and the rear cover 47 constitute the monitor cover 48, and this monitor cover 48 constitutes part of the rotation support section 16.

Figure 5:
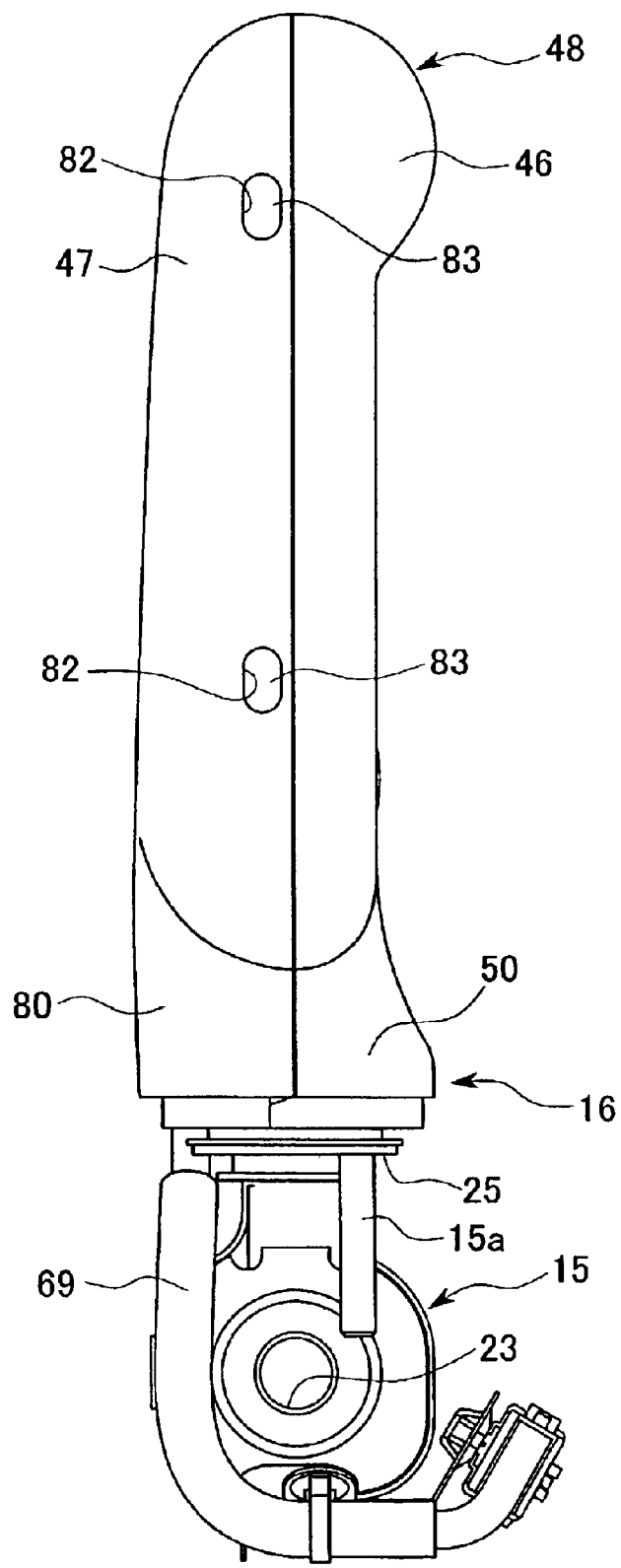
FIG. 5 is side view showing the essential sections of the in-vehicle monitor support structure according to an embodiment of the present invention.
Figure 8:
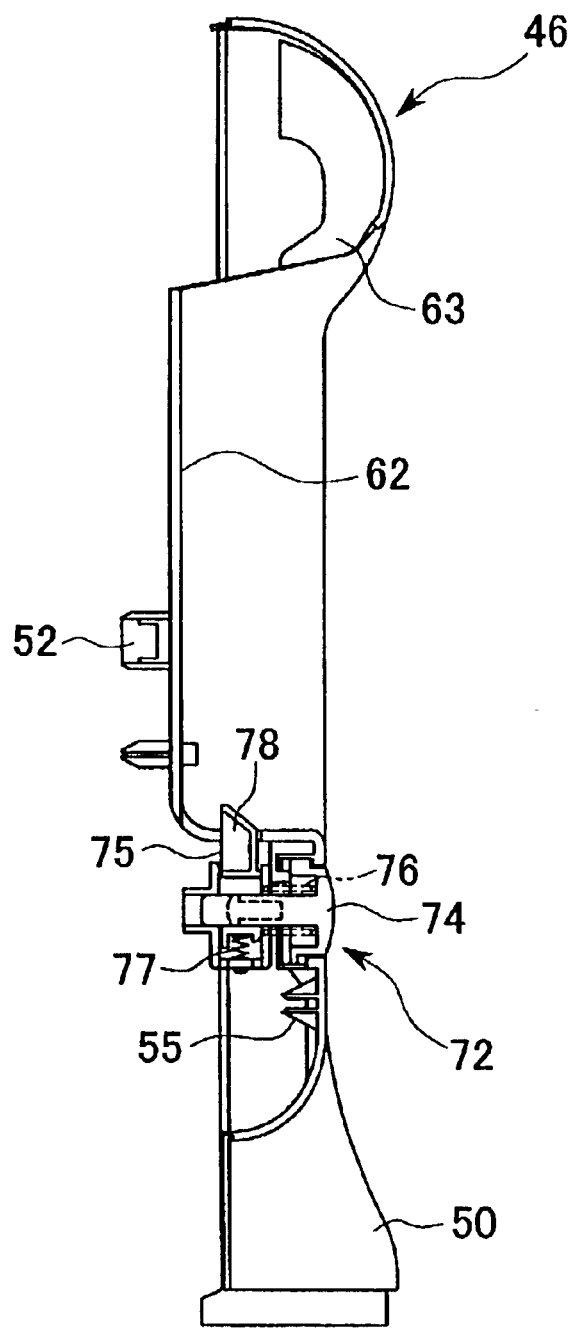
FIG. 8 is a side cross-sectional view showing the front cover of the monitor cover of the in-vehicle monitor support structure according to an embodiment of the present invention.
Figure 9:
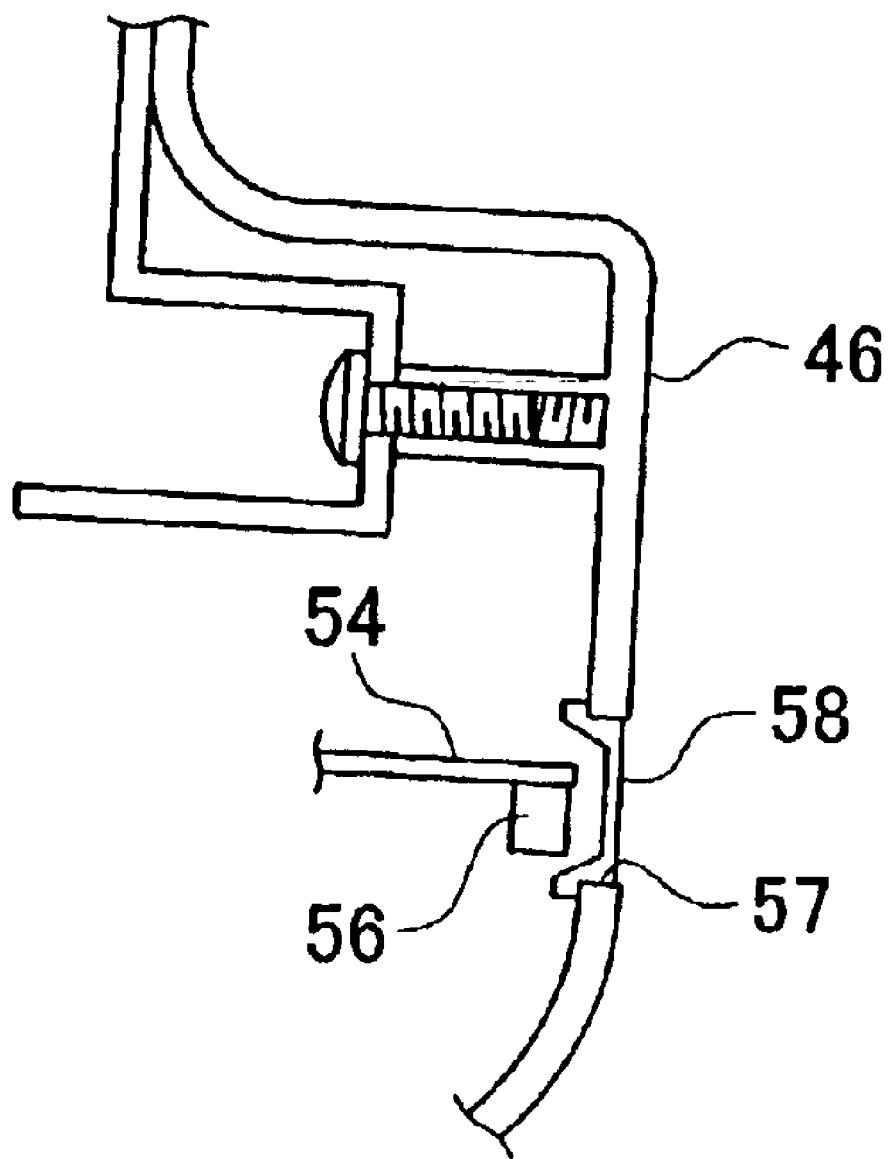
FIG. 9 is a partial side cross-sectional view showing the monitor cover of the in-vehicle monitor support structure according to an embodiment of the present invention.

The front cover 46 of the monitor cover 48 shown in FIG. 5 thorough FIG. 8 covers the support frame 37, the mounting base 38 and the support section 36, and is a substantially square shape, although on one side of the lower part of the front cover 46, a protrusion 50 is formed for covering the support section 36.

Figure 6:
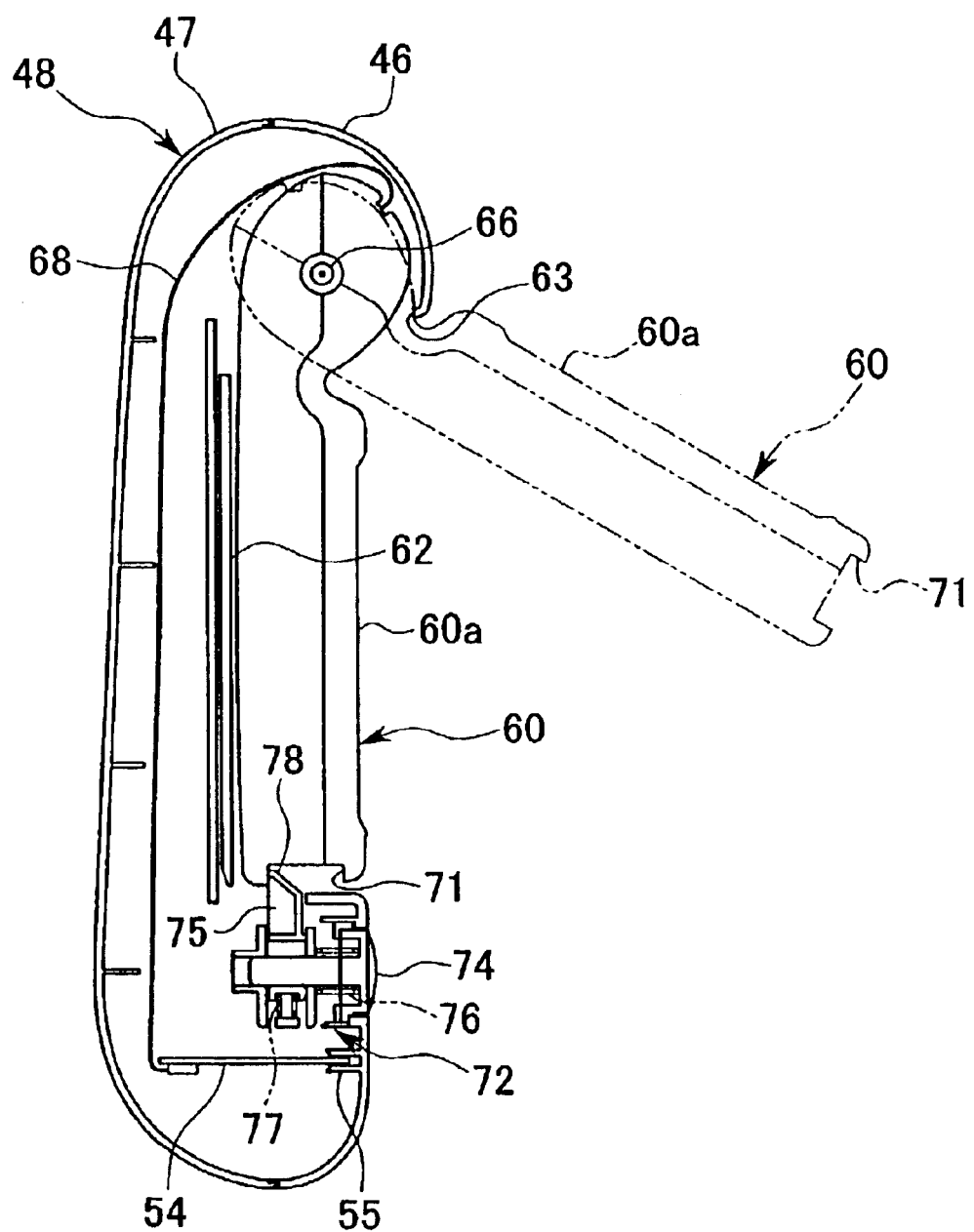
FIG. 6 is a side cross-sectional view showing the monitor and the monitor cover of the in-vehicle monitor support structure according to an embodiment of the present invention.
Figure 7:
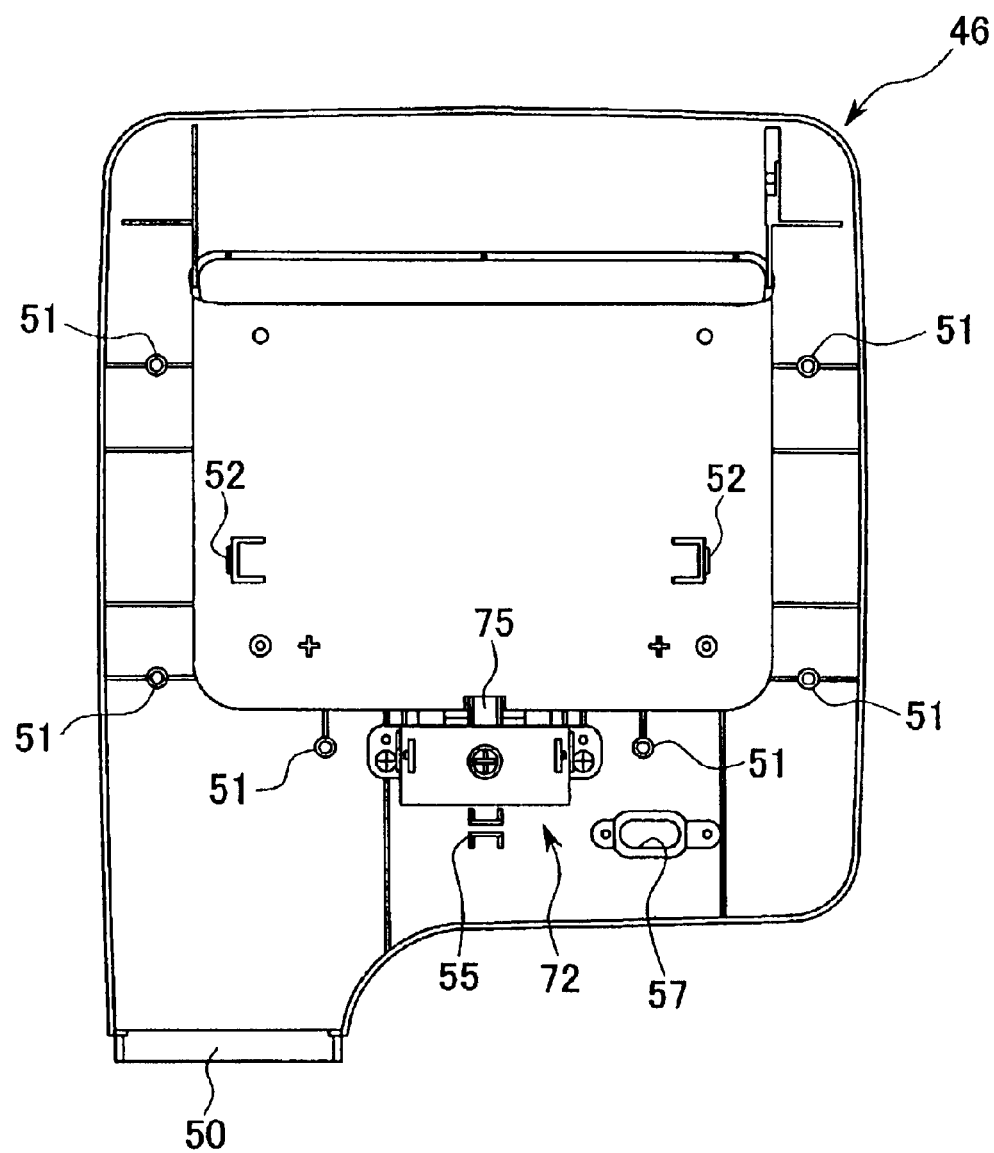
FIG. 7 is a diagram showing a rear view of a front cover of the monitor cover of the in-vehicle monitor support structure according to an embodiment of the present invention.

As shown in FIG. 7, mounting bosses 51 which are screwed to the front cover mounting sections 40 are formed on the rear of the front cover 46 in corresponding positions, and engagement hooks 52 which are inserted into the front cover engagement holes 44 and thus engage the front cover engagement holes 44 are also formed in corresponding positions. In addition, a retaining section 55 for retaining a circuit board 54 as shown in FIG. 6, and a light receiving aperture 57 for allowing a light receiving element 56 provided on the circuit board 54 to receive a signal from a separate wireless remote control device (not shown) are formed on the lower part of the rear of the front cover 46. This light receiving aperture 57 is covered by a translucent light receiving cover 58. The wireless remote control device is for performing functions such as changing the channel of a TV tuner or adjusting the display of a monitor 60 or the like.

A storage depression 62 for housing the LCD monitor 60 or the like is formed in substantially the center of the front of the front cover 46, and an opening 63 which opens to both the front and rear is formed at the top of the storage depression 62. The monitor 60 is housed in the storage depression 62 by inserting the top of the screen in through the opening 63 with the screen 60a facing away from the storage depression 62, as shown in FIG. 6. When the monitor 60 is stored in the storage depression 62 in this manner, then as shown on one side of FIG. 10, the monitor 60 is mounted on the pair of monitor mounting sections 41 of the mounting base 38 via a pair of monitor support sections 65 so as to be capable of rotation about a pair of support shafts 66 on the top of the monitor 60. In other words, the monitor 60 is mounted on the mounting base 38 via the monitor support sections 65 so as to pivot about the support shafts 66 on the top of the monitor 60 between a state in which the whole of the monitor 60 is housed within the storage depression 62, as shown by the solid line in FIG. 6, and a state in which the bottom of the monitor 60 protrudes from the storage depression 62, as shown by the dotted line in FIG. 6. The monitor support sections 65 also constitute a portion of the rotation support section 16.

Figure 11:
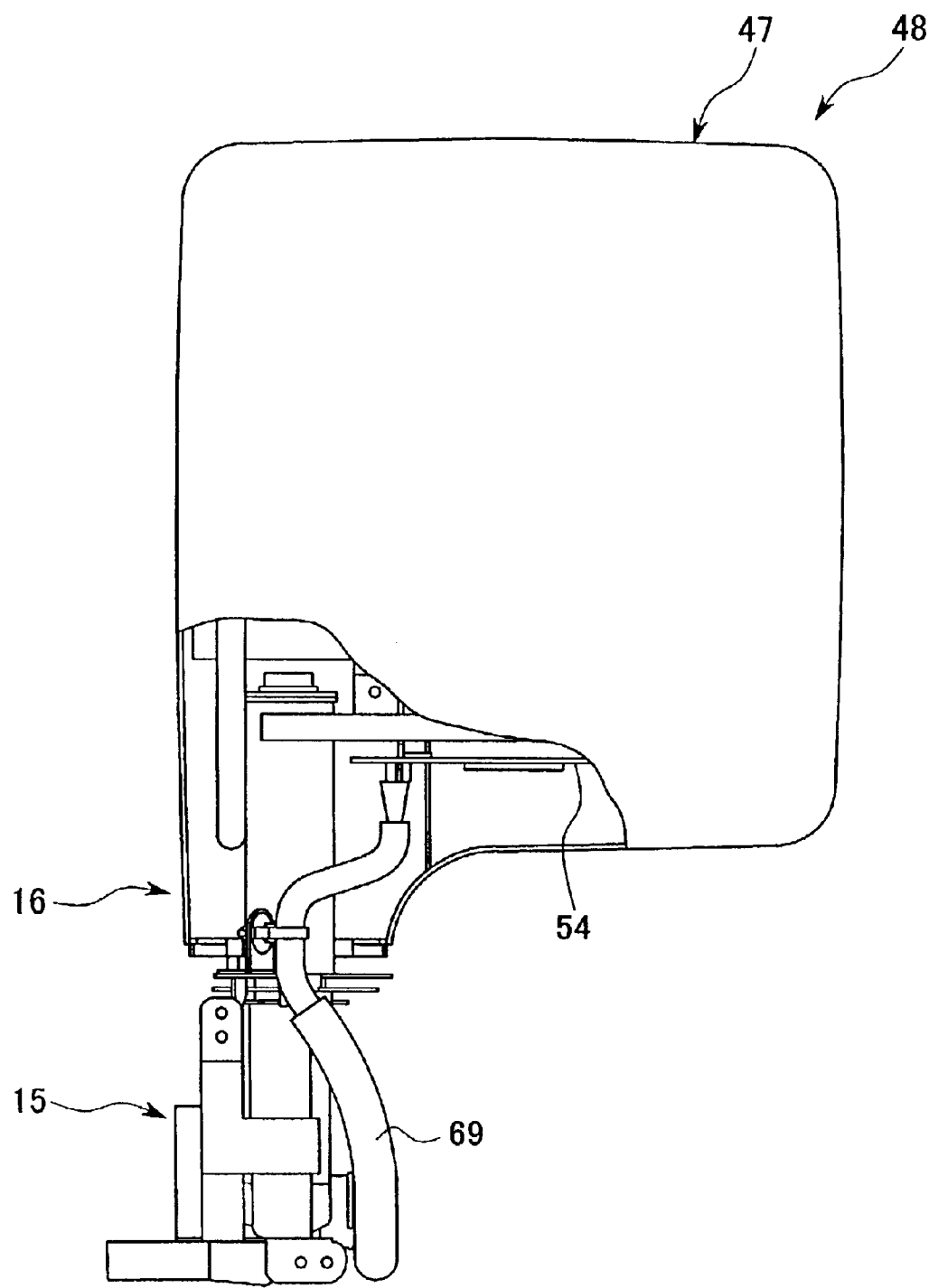
FIG. 11 is a partially cut away rear view showing the essential sections of the in-vehicle monitor support structure according to an embodiment of the present invention.

A pivoting stopping angle switching mechanism, which can switch the pivoting stopping angle of the monitor 60 relative to the front cover 46 between a plurality of steps and a stepless configuration (for example, within a range of 40 to 60°, although the present invention is not limited to this range), and which defines the pivoting limit, is provided on the monitor support sections 65. The monitor 60 which pivots in this manner and the circuit board 54 which is retained by the retaining section 55 are connected electrically using flexible wiring 68. In addition, as shown in FIG. 11, a harness 69 extends from the circuit board 54.

Figure 10:
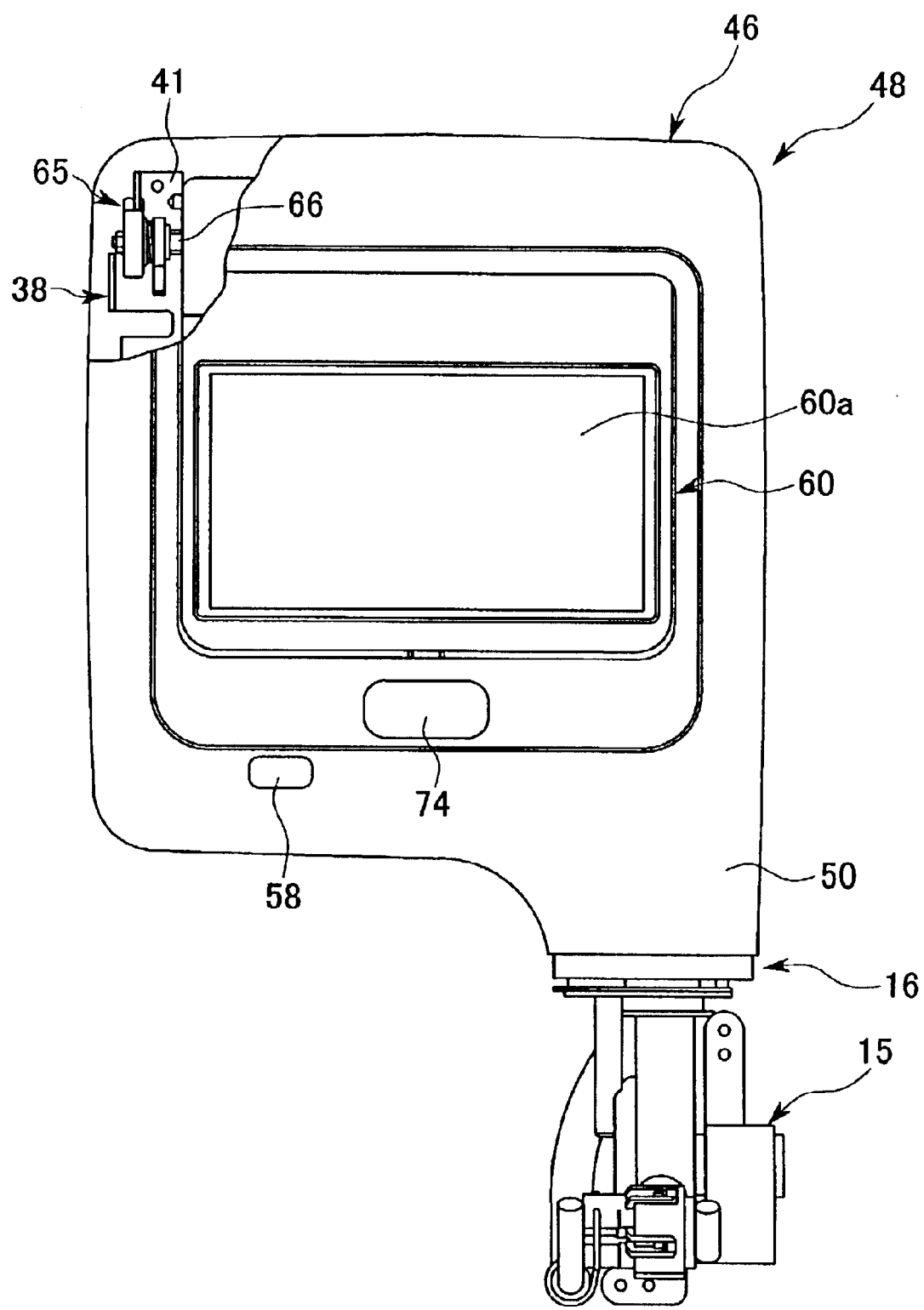
FIG. 10 is a partially cut away front view showing the essential sections of the in-vehicle monitor support structure according to an embodiment of the present invention.

As shown in FIG. 4, because the shape of the mounting base 38 is such that it extends laterally from the center axis of the rotation support section 35, then as shown in FIG. 10, the monitor 60 which is mounted on this mounting base 38 via the monitor support section 65 is supported so that one side of the monitor (one side in the sideways direction of the screen) is adjacent to the center axis of the rotation support shaft 35, in other words the center of rotation of the rotation support section 16, and the other side of the monitor 60 (the other side of the screen) is positioned laterally from this center axis.

As shown in FIG. 6, a locking mechanism 72 which locks or unlocks the monitor 60 with respect to the front cover 46 by engaging or disengaging with a locking hole 71 in the bottom of the monitor 60 when the monitor 60 is fully housed within the storage depression 62 is provided on the front cover 46 below the storage depression 62. As shown in FIG. 8, this locking mechanism 72 comprises a button 74 which protrudes from the front surface of the front cover 46 and is pressed by a user, a locking member 75 which is lowered by a cam and a slide (not shown in the figure) when a user presses the button 74, a return spring 76 which urges the button 74 in a direction opposite to the pressing direction, and a return spring 77 which urges the locking member 75 in an upwards direction.

The locking mechanism 72 is such that normally, the locking member 75 is raised by the urging force of the return spring 77, and a locking section 78 on the top of the locking member 75 extends into the storage depression 62. In this state, if the monitor 60 is fully housed within the storage depression 62, the locking section 78 engages with the locking hole 71 in the monitor 60, and the monitor 60 is thus locked with respect to the front cover 46 (refer to the state of the monitor 60 indicated by the solid line in FIG. 6).

On the other hand, if the button 74 is pressed in this state, the locking member 75 is lowered by the cam and the slide (not shown in the figure), and the locking section 78 comes out of the locking hole 71 of the monitor 60. Consequently, the monitor 60 can be pivoted about the support shaft 66 under the manual operation of a user, and stopped at any position within the range allowed by the pivoting stopping angle switching mechanism, which is not shown in the figure (refer to the state of the monitor 60 shown by the dotted line in FIG. 6). If at this time the user releases the button 74, then the button 74 returns to the surface of the front cover 46 by means of the return spring 76, and the other return spring 77 causes the locking member 75 to re-extend the locking section 78 so that it protrudes into the storage depression 62.

In addition, when the user pivots the monitor 60 manually, from this state, to store the monitor 60 inside the storage depression 62, the monitor 60 contacts the inclined locking section 78 and pushes down the locking member 75 while entering the storage depression 62, and when the locking member 75 meets the position of the locking hole 71, the locking member 75 enters the locking hole 71 under the urging force of the return spring 77, and the monitor 60 is thus locked with respect to the front cover 46.

Figure 12:
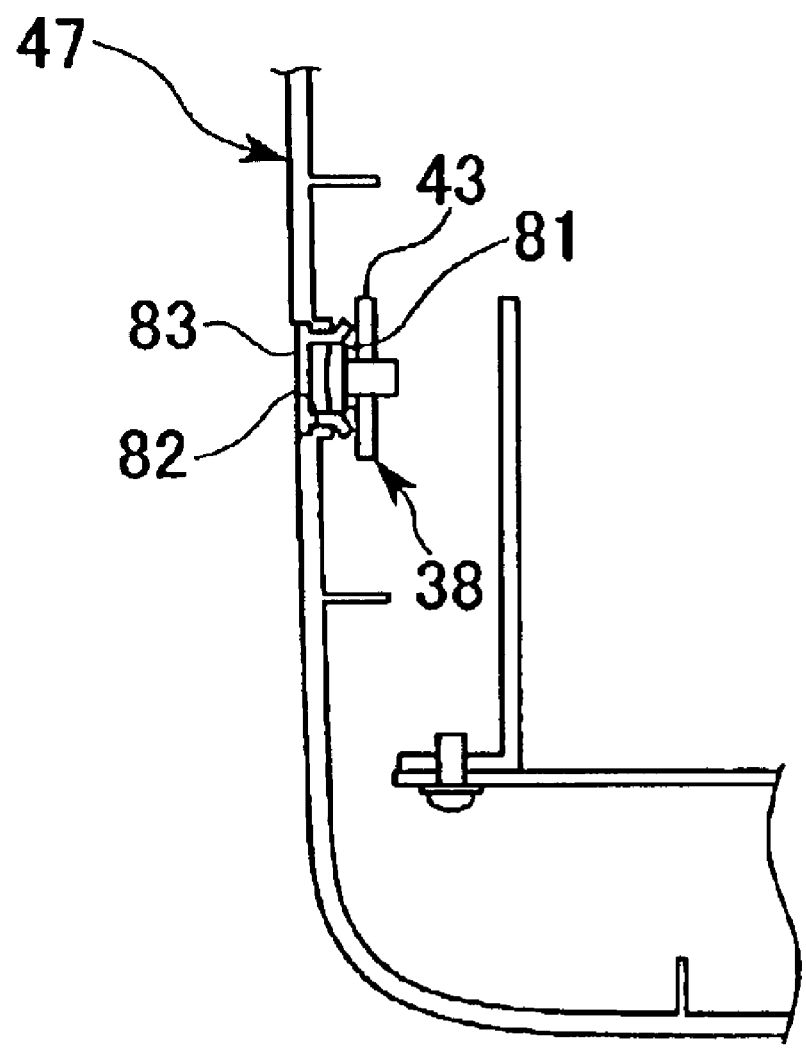
FIG. 12 is a partial front cross-sectional view showing the monitor cover of the in-vehicle monitor support structure according to an embodiment of the present invention.

By engaging with the front cover 46, the rear cover 47 of the monitor cover 48, covers the support frame 37, the mounting base 38 and a portion of the support section 36 in combination with the front cover 46, and as shown in FIG. 5, this rear cover 47 is substantially square shaped with a protrusion provided in the lower portion of the cover for covering the support section 36. As shown in FIG. 12, mounting sections 81 which are screwed to the rear cover mounting section 43 are formed in corresponding positions on the rear of the rear cover 47, and mounting holes 82 into which a screw or a tool can be inserted when attaching the rear cover, 47 to the rear cover mounting section 43 are formed on the sides of the rear cover 47. After a screw has been inserted into a mounting hole 82, a mounting hole cover 83 is engaged therein.

The steps involved in mounting the front cover 46, the rear cover 47 and the monitor 60 on the mounting base 38 are described below.

Firstly, the monitor support sections 65 of the monitor 60, which is in a state in which the monitor support sections 65 are mounted on the support shafts 66, are fixed to the monitor mounting sections 41, and subsequently, the monitor 60 is inserted into the opening 63 in the front cover 46, and the engagement hooks 52 of the front cover 46 are inserted into the front cover engagement holes 44 in the mounting base 38, thus engaging the front cover 46. Consequently, the front cover 46 is positioned generally relative to the mounting base 38 and fixed provisionally thereto.

The monitor support sections 65 are then screwed to the monitor mounting sections 41 of the mounting base 38, and the mounting bosses 51 of the front cover 46 are then screwed to the front cover mounting sections 40 of the mounting base 38 from the rear. The monitor 60 and the front cover 46 are thus mounted on the mounting base 38.

Next, the flexible wiring 68 is connected to the circuit board 54, the circuit board 54 is mounted on the retaining section 55 of the front cover 46, and the rear cover 47 engages with the front cover 46 so as to cover the mounting base 38. The mounting section 81 of the rear cover 47 is screwed to the rear cover mounting section 43 of the mounting base 38 from the side via the mounting holes 82, and the mounting hole covers 83 are than engaged in the mounting holes 82.

Figure 13:
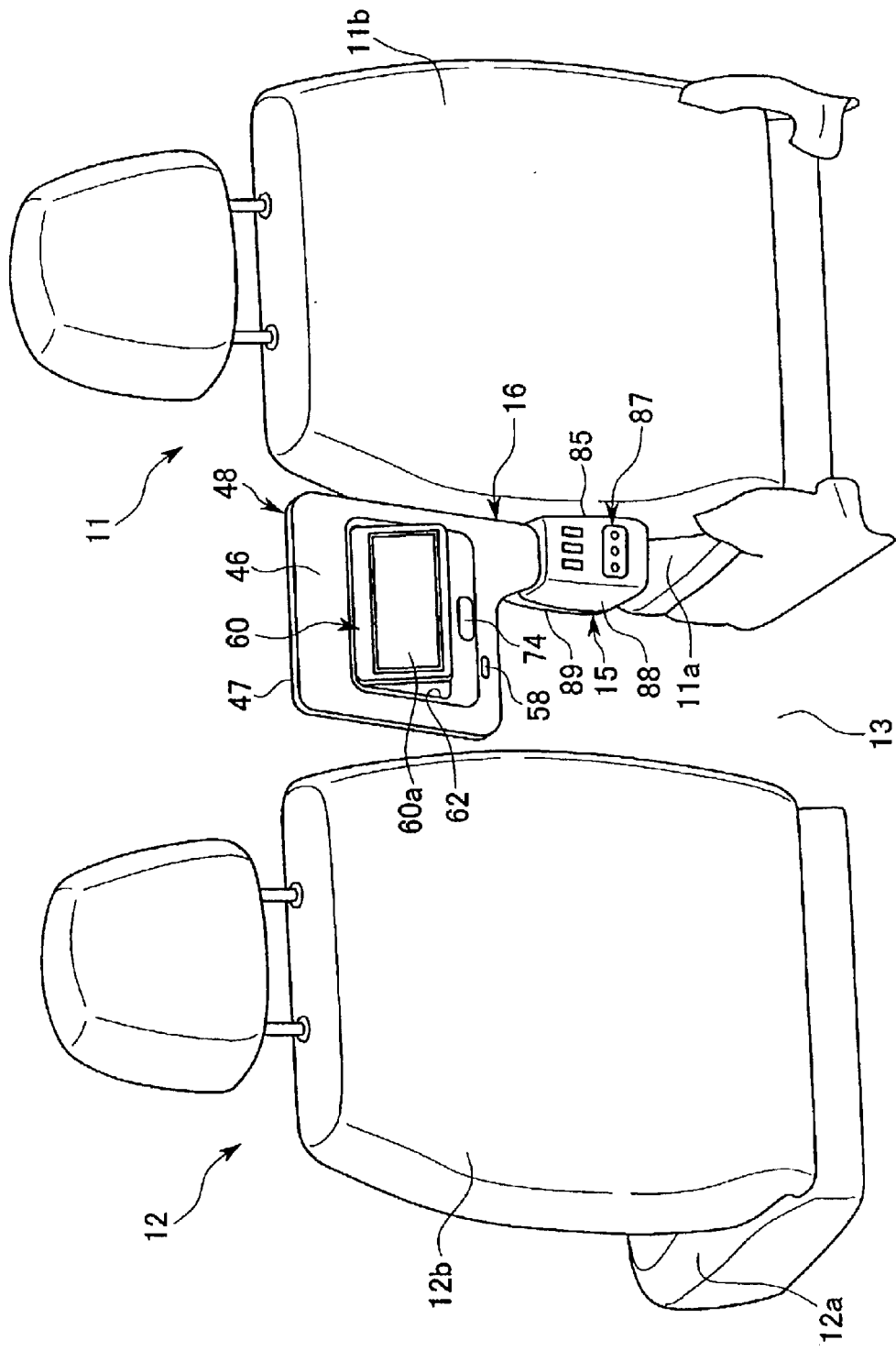
FIG. 13 is a perspective view showing the in-vehicle monitor support structure according to an embodiment of the present invention, in which the monitor is extended laterally, and is pivoted relative to the monitor cover.

By performing the above operations, the rotation support section 16 which is provided between the seat back 11b of the driver seat 11 and the seat back 12b of the passenger seat 12, adjacent to the seat back 11b, and which supports the monitor 60, can rotate about the rotation support shaft 35, and as a result, in the upright orientation, can rotate about the center axis of the vertical rotation support shaft 35. As shown in FIG. 1, if the monitor 60 and the monitor cover 48, which are supported by the rotation support section 16 so that one side of the monitor is adjacent to the center axis and the other side is positioned laterally from the center axis, are positioned in an orientation in which the side which is positioned laterally is located on the passenger seat 12 side, then the monitor 60 extends laterally between the seat back 11b of the driver seat 11 and the seat back 12b of the passenger seat 12 with the screen 60a facing the rear, producing a state in which the monitor can be viewed comfortably from the back seat. The angular position of the support section 36 at this time is the aforementioned in-use position, in which the rotation positioning member 15a has cleared one of the narrowed sections 39a in the annular guide depression 39 and is positioned at one end of the annular guide depression 39. In this state, as shown in FIG. 13, changes in the height of the point of view of the viewer can be accommodated by adjusting the pivoting angle of the monitor 60 relative to the monitor cover 48.

Figure 14:
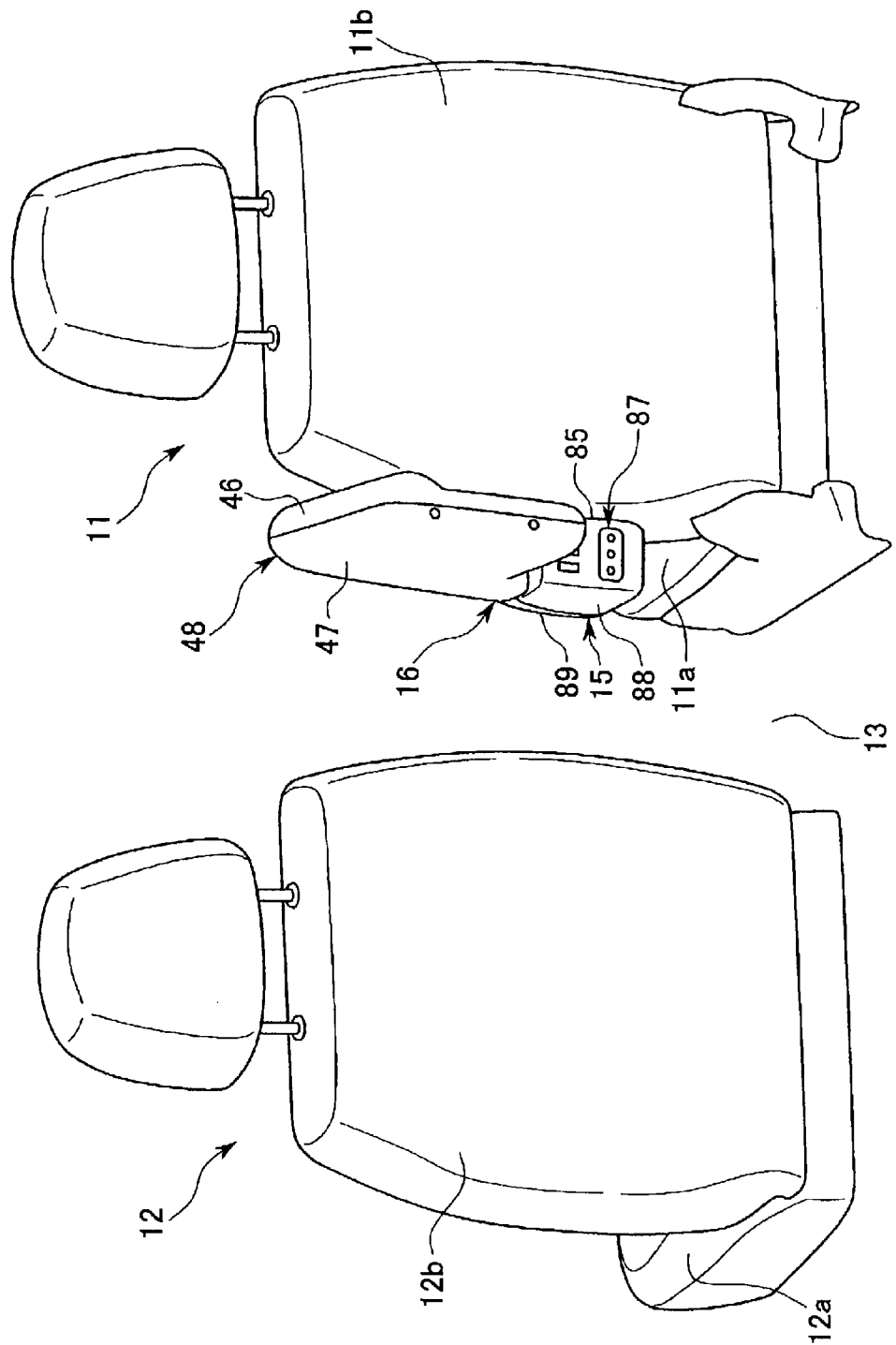
FIG. 14 is a perspective view showing the in-vehicle monitor support structure according to an embodiment of the present invention, which shows the monitor in a stowed state.

On the other hand, in the upright orientation, by rotating the rotation support section 16 and positioning the monitor 60 and the monitor cover 48 in an orientation in which the side which is positioned laterally is located on the rear seat side, as shown in FIG. 14, then the monitor 60 and the monitor cover 48 move away from the passenger seat 12 and are stowed towards the driver seat 11 and the rear seat, and a passage through which people can pass is formed between the driver seat 11 and the passenger seat 12, allowing walk through access between the front and rear seats. The angular position of the support section 36 at this time is the aforementioned storage position, in which the rotation positioning member 15a has cleared the other narrowed section (not shown in the figure) in the annular guide depression 39 and is positioned at the other end of the annular guide depression 39.

The rotation support section 16 can basically be rotated to, and stopped at any position, provided that a collision does not occur with the driver seat 11, and it is therefore possible to face the monitor 60 and the screen 60a slightly toward the right when only viewing from the right of the rear seat, or face the monitor 60 and the screen 60a slightly toward the left when only viewing from the left of the rear seat. In fact, the angle of the monitor 60 and screen 60a can be freely changed according to the position of the viewer. When the monitor 60 is at any angle, changes in the height of the point of view of the viewer can be accommodated by adjusting the pivoting angle of the monitor 60 relative to the monitor cover 48. However, when the rotation support section 16 is in the upright orientation, the monitor 60 and the screen 60a are preventing from being directed toward the driver by means of the annular guide depression 39 and the rotation positioning member 15a.

Normally, even if a small amount of forward force is applied to the monitor 60 or the rotation support section 16, the upright orientation of the monitor 60 and the rotation support section 16 is maintained by the control plates 30 controlling the movement of the guide pins 21, but if for example the vehicle is involved in a collision or the like, and a passenger in the rear seat collides with the monitor 60 or the rotation support section 16 which supports the monitor 60, thus applying a load greater than a predetermined value between the seat side mounting base section 19 and the pivoting member 24, the control plates 30 are pushed against by the guide pins 21 of the seat side mounting base section 19 and deform or break. As a result, the control plates 30 deform or break, thus broadening the openings 31 of the guide grooves 28, and the control plates 30 fall away from the guide grooves 28 upon breaking or deforming, and the pivoting member 24 of the support section 15 can then rotate relative to the seat side mounting base section 19, centered about the pivoting support shaft 20, through the action of the guide pins 21 moving along the broadened guide grooves 28. In other words, the rotation support section 16 in the upright orientation is pivoted frontward about a horizontal axis by the pivoting support section 15, and thereby absorbs the energy of the impact of a passenger on the rotation support section 16 either directly or via the monitor 60.

If the energy of the impact cannot be fully absorbed by the rotation of the rotation support section 16, then because notches 42 are formed on the insides of both monitor mounting sections 41 of the flat base section 38 to which the monitor 60 is mounted, the monitor 60, which is a rigid body, deforms both monitor mounting sections 41, and the energy of the impact of a passenger on the rotation support section 16 is further absorbed, either directly or via the monitor 60.

As shown in FIG. 1, a pivoting section cover (cover) 85 which constitutes an outer shell is provided on the pivoting section 15. The pivoting section cover 85 is provided so as not to impede the rotation of the rotation support section 16 about the rotation support shaft 35, and if the rotation support section 16 pivots about the pivoting support shaft 20 due to a passenger colliding with the monitor 60 or the rotation support section 16, or in other words when the pivoting member 24 rotates, the pivoting section cover 85 pivots together with this pivoting member 24.

The pivoting section cover 85 comprises a front cover 88 which faces the rear seats when the rotation support section 16 is in the upright orientation, and a rear cover 89 which is on the opposite side, and on the surface of the front cover 88, which faces the rear seats when the rotation support section 16 is in its upright orientation, is provided a terminal section 87 which includes such terminals as an external input terminal for connecting an external device which outputs images to the monitor 60, and an output terminal for connecting headphones. This terminal section 87 is connected to the harness which extends from the circuit board 54 inside the pivoting section cover 85. Specifically, external devices such as television games, video cameras and video recorders are connected to this terminal section 87, which receives input of video signals and audio signals from these devices, or if an audio player device is connected, receives an audio signal from this external device. A received video signal is output to the monitor 60, and an audio signal is output to a speaker (not shown).

In the in-vehicle monitor support structure according to the present embodiment described above, if the monitor 60, which is supported by the rotation support section 16 in a state where one side is adjacent to a vertical axis on the side of the driver seat 11 which faces the passenger seat 12 and the other side is positioned laterally from the axis, is moved to an orientation in which the side which is positioned laterally is located on the passenger seat 12 side by rotating the rotation support section 16, which is provided so as to rotate about the aforementioned vertical axis, then the monitor extends laterally between the driver seat 11 and the passenger seat 12, in a favourable state for viewing from the rear seat.

Because the monitor 60 is positioned between the seat back 11b of the driver seat 11 and the seat back 12b of the passenger seat 12, a passenger does not need to look diagonally upward to view the monitor 60, and can view the monitor 60 by looking substantially straight ahead.

Furthermore, because the monitor 60 is positioned between the seat back 11b of the driver seat 11 and the seat back 12b of the passenger seat 12, a plurality of people in the back seat can comfortably view a single monitor 60.

On the other hand, by rotating the rotation support section 16 so that the laterally positioned edge of the monitor 60 and the monitor cover 48 are located, for example, towards the rear seat, the monitor 60 and the monitor cover 48 can be moved away from the passenger seat 12 and stowed towards the driver seat 11, forming a passage between the driver seat 11 and the passenger seat 12 through which people can pass.

Consequently, even when the monitor is installed so as to be viewed primarily by viewers seated in the back seat, the monitor can be viewed comfortably, increases in cost can be minimized, and movement between the front and rear seats, that is, so called walk-through access, can be easily achieved.

Moreover, because the rotation support section 16 and the pivoting support section 15 which support the monitor 60 are provided on the driver seat 11, and the driver seat is never empty while the vehicle is moving, vibration occurring at the monitor 60 can be suppressed, and the screen is unlikely to shake. Furthermore, by supporting the monitor 60 on the driver seat 11, viewing of the monitor 60 by the driver while driving can be made difficult.

The seat side mounting base 19 which is fixed to the seat frame 18 of the pivoting support section 15, and the pivoting support shaft 20 and the guide pins 21 and the like, may also simply utilize the pivoting mechanism of an armrest attached to the driver seat 11. Consequently, if the driver seat 11 has an armrest attached, this can be used, as is, to support the monitor 60 (of course, this also applies for the passenger seat 12). On the other hand, if instead of using the rotation support section 16 and the pivoting member 24 of the pivoting support section 15 and the like, the armrest is mounted on the pivoting support shaft 20, then by rotating about a horizontal axis this armrest can move from an in-use position to a storage position by the front of the armrest pivoting upward and downward.

Furthermore, according to the aforementioned embodiment, the pivoting support shaft 20, with an axis directed from the driver seat 11 towards the passenger seat 12, is provided on the seat side mounting base 19 on the driver seat 11, which is one of two seats, namely the driver seat 11 and the passenger seat 12 which are provided on either side of the vehicle with space provided therebetween, on the side of the seat which faces the passenger seat 12, and by supporting the monitor 60 on this pivoting support shaft 20 via the pivoting support section 15 and the rotation support section 16, the monitor 60 can be positioned between the driver seat 11 and the passenger seat 12.

Furthermore, even if a passenger should collide with the monitor 60 or the rotation support section 16, because a load greater than a predetermined value is applied to the seat side mounting base 19 and the pivoting support section 15, the control plates 30 are deformed or broken by the guide pin 21, causing the pivoting support section 15 and the rotation support section 16 to rotate relative to the seat side mounting base section 19, about the pivoting support shaft 20, thus absorbing the collision energy.

Consequently, the monitor 60 can be provided between the driver seat 11 and the passenger seat 12, viewing the monitor from the rear seat is comfortable, increases in cost can be minimized, and the collision energy of any collision with the monitor 60 or the rotation support section 16 can be absorbed.

Consequently, by providing the monitor 60 between the driver seat 11 and the passenger seat 12, both comfortable viewing and a suppression of cost increases can be achieved, and even if a passenger should collide with the monitor 60 or the rotation support section 16, the collision energy can be absorbed.

Moreover, because notches 42 are formed in the sides of the monitor mounting sections 41 of the mounting base 38, in the case of a collision with the monitor 60 or the rotation support section 16, the monitor mounting sections 41 deform easily relative to the mounting base 38, and as a result, collision energy can be further absorbed.

In addition, the seat side mounting base section 19 which is fixed to the seat frame 18 of the pivoting support section 15, and the pivoting support shaft 20 and the guide pins 21 and the like, may also simply utilize the pivoting mechanism of an armrest attached to the driver seat 11. Consequently, if the driver seat 11 has an armrest attached, this can be used, as is, to support the monitor 60 (of course, this also applies for the passenger seat 12). On the other hand, if instead of using the rotation support section 16 and the pivoting member 24 of the pivoting support section 15 and the like, the armrest is mounted on the pivoting support shaft 20, then by rotating about a horizontal axis this armrest can move from an in-use position to a storage position by the front of the armrest pivoting upward and downward.

The embodiment above was described using an example in which the in-vehicle monitor support structure was provided on the side of the driver seat 11 which faces the passenger seat 12, but the in-vehicle monitor support structure can, of course, be provided on the side of the passenger seat 12 which faces the driver seat 11. Furthermore, if the seats are arranged in three rows or more, the in-vehicle monitor support structure can be provided on one of any set of seats provided on either side of the vehicle with space provided therebetween, on the side of the seat which faces the other seat, provided the monitor is positioned behind the driver seat 11 and the passenger seat 12 and is not mounted on the rearmost seat in the vehicle.

Furthermore, in describing the embodiment above, an example was used in which the monitor 60 pivots relative to the monitor cover 48, but because the rotation support section 16 is able to be rotated about a horizontal axis by means of the pivoting support section 15, the monitor 60 may be fixed relative to the monitor cover 48, and pivoted by pivoting the rotation support section 16 backward and forward using the pivoting support section 15.

Moreover, in describing the embodiment above, an example was used in which guide pins 21 were provided in the seat side mounting base section 19 and guide grooves 28 were provided in the pivoting member 24 of the pivoting support section 15, but of course, it is also possible to provide the guide pins on the pivoting member 24, and provide the guide grooves in the seat side mounting base section 19.

What is claimed is:

1. An in-vehicle monitor support structure, comprising:
   first and second seats positioned in a vehicle with space for walking provided between them, said first seal having a seatback with a frame;
   a rotation section fixed to said frame of said seatback of said first seat and provided so that said rotation section can rotate about a vertical axis, said rotation section being provided on a side of said first seat; and
   a monitor supported on the rotation section, wherein the side of said first seat faces a side of said second seat, one side of said monitor is adjacent to the vertical axis, and another side of said monitor is positioned laterally outward from the vertical axis.

2. An in-vehicle monitor support structure according to claim 1, wherein a terminal section which includes an external output terminal for outputting an audio signal of the monitor is provided on a cover of a support section which supports the rotation section.

3. An in-vehicle monitor support structure according to claim 1, wherein the monitor is supported on the rotation section so that the monitor can rotate about the vertical axis and a horizontal axis.

4. An in-vehicle monitor support structure according to claim 3, wherein a screen of the monitor can rotate about a horizontal axis.

5. An in-vehicle monitor support structure, comprising:
   a base section mounted on a vehicle, and
   a support section which is connected to the base section via a support shaft in a manner which enables rotation, and which supports a monitor in a space for walking between seatbacks of seats positioned in a vehicle, wherein
   a guide groove is formed in one of either the base section and the support section,
   a guide section is provided in another of either the base section and the support section which moves along the guide groove when the support section rotates relative to the base section,
   and a control plate which covers the guide groove is provided so that by controlling movement of the guide section within the guide groove with the control plate, rotation of the support section relative to the base section is controlled, whereas if a load of greater than a predetermined value is applied between the base section and the support section, the control plate either deforms or breaks to absorb a collision energy when colliding from a rear side of said seats with said monitor or said support section, and the support section rotates relative to the base section.

6. An in-vehicle monitor support structure according to claim 5, wherein the base sect on is mounted on either one of said seats positioned on either side of a vehicle with the space provided therebetween, on a side of the seat which faces another seat, and an axis of the support shaft is positioned in a direction pointing from the seat, to the other seat.

7. An in-vehicle monitor support structure according to claim 6, wherein the monitor supported mounting section of a flat mounting base within the support section, and a notch is formed in a side of the monitor mounting section of the mounting base.

8. An in-vehicle monitor support structure according to claim 5, wherein the monitor is supported by a monitor mounting section of a flat mounting base within the support section, and a notch is formed in a side of the monitor mounting section of the mounting base.

9. An in-vehicle monitor support structure according to claim 5, wherein the monitor is supported on the support section so that the monitor can rotate about the vertical axis and a horizontal axis.

10. An in-vehicle monitor support structure according to claim 9, wherein a screen of the monitor can rotate about a horizontal axis.

* * * * *